(12) United States Patent
Boissiere et al.

(10) Patent No.: US 9,610,723 B2
(45) Date of Patent: Apr. 4, 2017

(54) BIMODAL POLYETHYLENE FOR INJECTION STRETCH BLOW MOULDING APPLICATIONS

(75) Inventors: Jean-Marie Boissiere, Brussels (BE); Aurélien Vantomme, Bois-de-Villers (BE); Pierre Belloir, Braine-l'Alleud (BE); Alain Van Sinoy, Chastre (BE)

(73) Assignee: TOTAL PETROCHEMICALS RESEARCH FELUY, Seneffe (Feluy) (BE)

( * ) Notice: Subject to any disclaimer, the term of this patent is extended or adjusted under 35 U.S.C. 154(b) by 1365 days.

(21) Appl. No.: 13/503,716

(22) PCT Filed: Nov. 3, 2010

(86) PCT No.: PCT/EP2010/066703
§ 371 (c)(1),
(2), (4) Date: Jul. 17, 2012

(87) PCT Pub. No.: WO2011/057924
PCT Pub. Date: May 19, 2011

(65) Prior Publication Data
US 2012/0282422 A1    Nov. 8, 2012

(30) Foreign Application Priority Data

Nov. 10, 2009   (EP) .................................... 09175544
Mar. 19, 2010   (EP) .................................... 10156984

(51) Int. Cl.
| | |
|---|---|
| B29C 49/06 | (2006.01) |
| B32B 1/00 | (2006.01) |
| C08F 10/02 | (2006.01) |
| C08F 210/16 | (2006.01) |
| B29C 49/00 | (2006.01) |
| B65D 1/02 | (2006.01) |
| B65D 1/44 | (2006.01) |
| C08F 2/12 | (2006.01) |

(52) U.S. Cl.
CPC ........ B29C 49/0005 (2013.01); B65D 1/0207 (2013.01); B65D 1/44 (2013.01); C08F 210/16 (2013.01); B29C 49/06 (2013.01); B29K 2023/06 (2013.01); B65D 2501/0036 (2013.01); Y10T 428/1397 (2015.01)

(58) Field of Classification Search
CPC .......... C08F 2/001; C08F 2/12; C08F 210/16; C08F 2500/05; C08F 2500/13; C08F 10/00; C08F 2500/07; C08F 2500/12; B29K 2023/0608; B65D 1/0207; B29C 49/005; B29C 49/06
USPC ........................................................... 526/65
See application file for complete search history.

(56) References Cited

U.S. PATENT DOCUMENTS

| | | | |
|---|---|---|---|
| 5,106,804 A | 4/1992 | Bailly et al. | |
| 5,153,158 A | 10/1992 | Kioka et al. | |
| 5,594,071 A | 1/1997 | Takahashi et al. | |
| 6,930,071 B2 * | 8/2005 | Knoeppel | B01J 31/0212 502/103 |
| 2002/0065368 A1 | 5/2002 | Debras et al. | |

FOREIGN PATENT DOCUMENTS

| | | |
|---|---|---|
| EP | 151741 A2 | 8/1985 |
| EP | 0989140 A1 | 3/2000 |
| EP | 1584651 A1 | 10/2005 |
| EP | 2053084 A1 | 4/2009 |
| JP | H09194534 A | 7/1997 |
| JP | 2000086722 A | 3/2000 |
| JP | 2000086833 A | 3/2000 |
| JP | 2003253062 A * | 9/2003 |
| JP | 2007-002235 A | 1/2007 |
| WO | 9511791 A2 | 5/1995 |
| WO | 2005005143 A1 | 1/2005 |
| WO | WO 2007/003323 A1 * | 1/2007 ............... H01B 3/44 |

OTHER PUBLICATIONS

Plastics Additives Handbook, ed. H. Zweifel, 5th edition, 2001, Hanser Publishers.

* cited by examiner

*Primary Examiner* — Fred M Teskin
(74) *Attorney, Agent, or Firm* — Albert Shung

(57) ABSTRACT

A polyethylene resin having a multimodal molecular weight distribution comprising at least two polyethylene fractions A and B, fraction A being substantially free of comonomer and having a lower weight average molecular weight and a higher density than fraction B, each fraction prepared in different reactors of two reactors connected in series in the presence of a Ziegler-Natta catalyst system, the polyethylene resin having a density of from 0.950 to 0.965 g/cm³ and a melt index MI2 of from 0.5 to 5 g/10 min.

16 Claims, 5 Drawing Sheets

Fig. 2 Attempted bottle obtained by ISBM with Grade Z

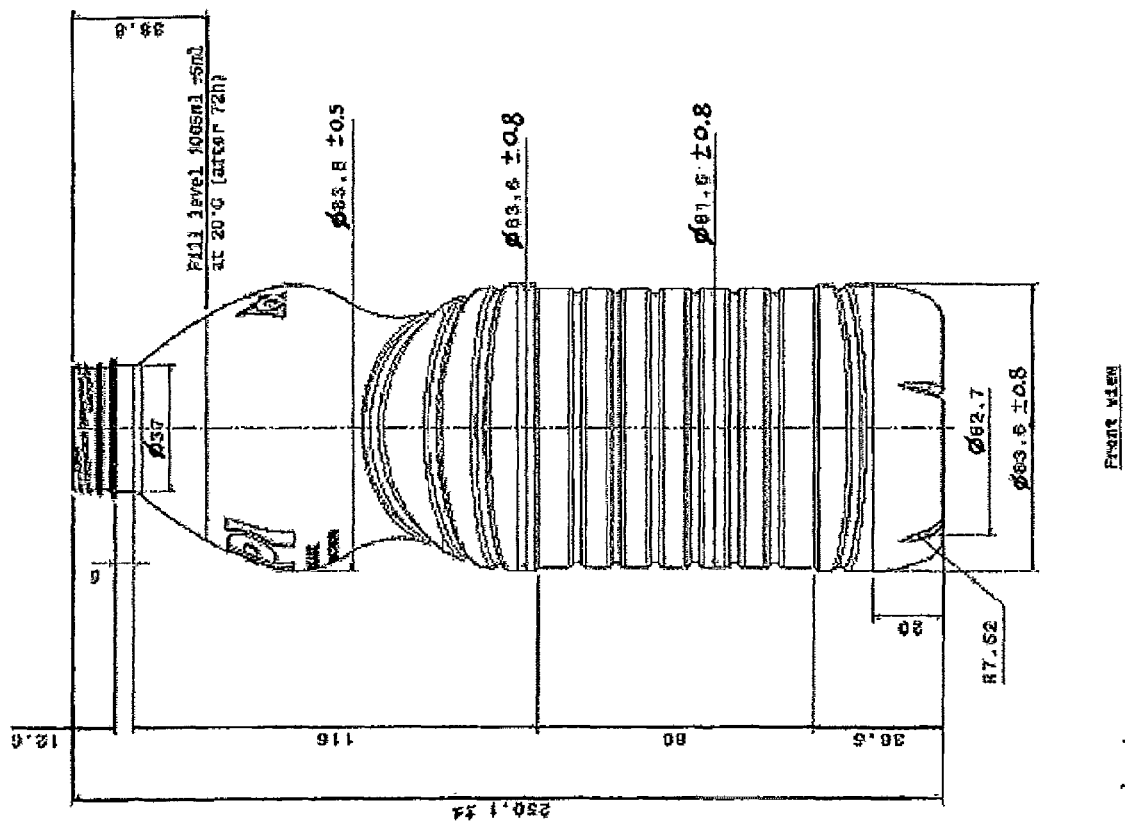
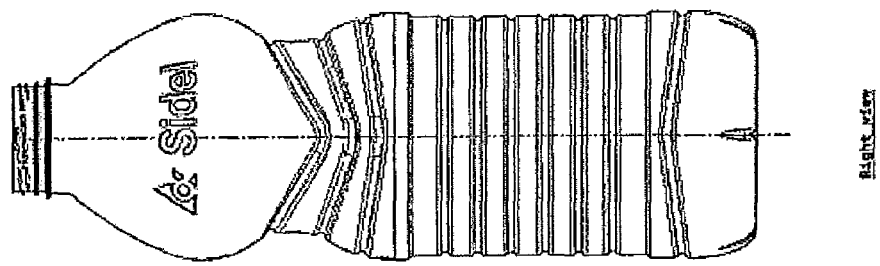
Fig. 6 Bottle design

Fig. 7 Bottle made with Grade Y according to the invention

BIMODAL POLYETHYLENE FOR INJECTION STRETCH BLOW MOULDING APPLICATIONS

CROSS-REFERENCE TO RELATED APPLICATIONS

This application claims the benefit of PCT/EP2010/066703, filed Nov. 3, 2010, which claims priority from EP 09175544.7, filed Nov. 10, 2009, and EP 10156984.6, filed Mar. 19, 2010.

FIELD OF THE INVENTION

The present invention relates to a polyethylene resin with a multimodal, preferably bimodal, molecular weight distribution for the preparation of polyethylene preforms for one- or two-stage injection-stretch-blow-moulding (ISBM) processes and to the ISBM articles produced therefrom.

BACKGROUND OF THE INVENTION

Injection-stretch blow molding (ISBM) is a process widely used for the production of containers, such as bottles, using thermoplastic polymers. The process includes the steps of preparing a pre-form by injection molding and then expanding the pre-form to the desired final shape. In general, one distinguishes one-stage and two-stage processes. In the one-stage process the steps of producing the pre-form and expanding the pre-form to the desired final shape are performed in the same machine. In the two-stage process these two steps are performed in different machines, in some cases even in different geographical locations; the pre-form is allowed to cool to ambient temperature and is then transported to a second machine where it is reheated and expanded to the desired final shape. Due to reasons of production speed and flexibility the two-stage process is preferred for larger production volumes.

Recent progress in development has made polypropylene a viable alternative to polyethylene terephthalate (PET) for injection-stretch blow molding (ISBM). Due to their good optical properties propylene-ethylene random copolymers are the preferred polypropylene grades.

For the injection molding of polypropylene it is well known to improve the impact performance, while also having good optical properties, by the addition of a polyethylene, which has been produced using a metallocene catalyst.

For example, EP-A-151741 to Mitsui discloses single-stage manufacturing of articles by ISBM. These articles are prepared from propylene-ethylene random copolymers having a melt flow index of from 4 to 50 dg/min and containing a nucleating agent.

WO95111791 to Bekum is directed to a two-stage process for preparing articles by ISBM. The preferred resin is an ethylene-propylene copolymer containing more than 50 wt % of propylene and having a melt index of from 10 to 20 dg/min.

WO 2005/005143 to Total Petrochemicals discloses blow-molded containers made from a blend of polypropylene and a metallocene polyethylene to improve the impact strength.

The polypropylenes presently used in injection-stretch blow molding applications allow for the production of containers with good optical properties at industrially viable production rates. However, as compared to other polymers used in injection-stretch blow molding polypropylene suffers from a lack of the combination of high rigidity and high ESCR, as well as high impact strength, particularly at lower temperatures.

Thus, there is an interest for improving the impact performance, rigidity and ESCR of injection-stretch blow molded containers. A balance has to be found between the high fluidity required for the first step to form the preform and the lower fluidity required for the second step when blowing the preform.

JP2000086722 to Asahi discloses the use of high-density polyethylene, preferably prepared with a metallocene catalyst, suitable for injection stretch blow molding.

JP2000086833 to Asahi discloses the use of resin compositions suitable for injection stretch blow molding at a high stretch ratio, comprising a polyethylene prepared with a metallocene catalyst and a polyethylene prepared with a chromium catalyst.

JP9194534 to Mitsui discloses the use of a polyethylene-based resin for injection stretch blow molding having a density of 0.940 to 0.968 g/cm$^3$ and a melt flow index of 0.3 to 10 g/10 min (ASTM D1238 at 190° C. and 2.16 kg).

It is an aim of the invention to provide a polyethylene resin for injection stretch blow moulding with a broad processing window.

It is also an aim of the invention to provide a polyethylene resin for injection stretch blow moulding with good process stability.

It is an aim of the invention to provide a polyethylene resin for injection stretch blow moulding with a high environmental stress crack resistance (ESCR measured with 100% Igepal CO-630). The environmental stress crack resistance is advantageously of at least 100 h, preferably at least 400 h.

In addition is an aim of the invention to provide a polyethylene resin for injection stretch blow moulding with a high impact resistance.

Furthermore, it is an aim of the invention to provide a polyethylene resin for injection stretch blow moulding with high rigidity.

In addition, it is also an aim of the invention to provide a polyethylene resin for injection stretch blow moulding to prepare containers with a high top load. The top load is the ability of a standing bottle to withstand the weight of other bottles on pallets.

It is further an aim of the invention to provide a polyethylene resin for injection stretch blow moulding to prepare containers with good thickness repartition.

It is additionally an aim of the invention to provide a polyethylene resin for injection stretch blow moulding to prepare containers with good surface aspects.

It is furthermore an aim of the invention to provide a polyethylene resin for injection stretch blow moulding to prepare containers with good finishing for molded drawings.

Finally, it is also an aim of the invention to provide a polyethylene resin suitable for injection stretch blow moulded containers for consumer packaging, in particular for cosmetics and detergents.

At least one of these aims is fulfilled by the resin of the present invention.

BRIEF DESCRIPTION OF THE DRAWING

FIG. 6 shows the schematics of a bottle design FIG. 7 shows an ISBM Bottle made with Grade Y according to the invention

SUMMARY OF THE INVENTION

Figure 1:
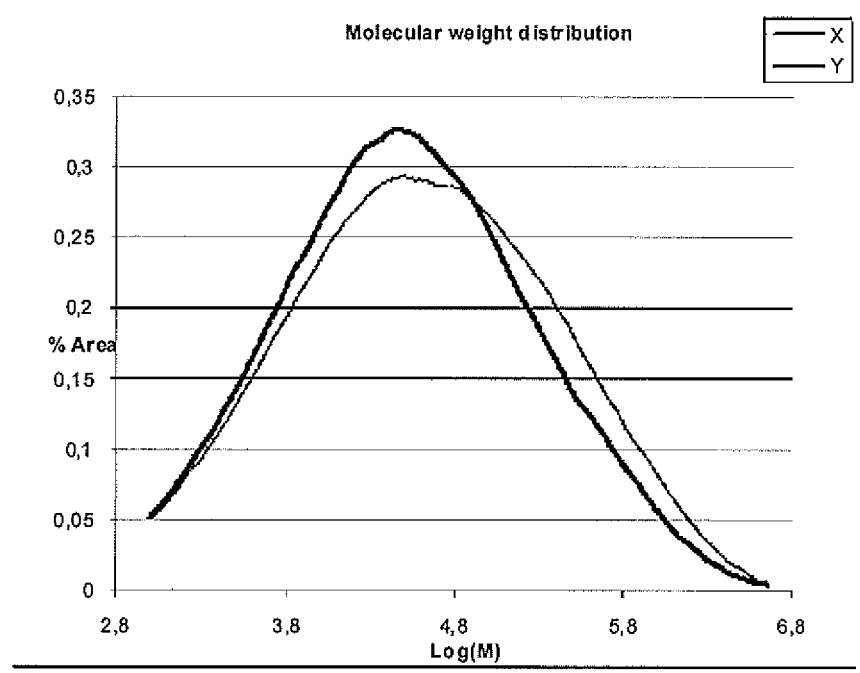
FIG. 1 shows the molecular weight distribution of two polyethylene resins having a bimodal molecular weight distribution, Grade Y being a resin according to the invention. The bimodality is shown as a shoulder on the gaussian curve at around Log(M)=4.8

A polyethylene resin having a multimodal molecular weight distribution comprising at least two polyethylene fractions A and B, fraction A being substantially free of comonomer and having a lower weight average molecular weight than fraction B and a higher density than fraction B, each fraction prepared in different reactors of two reactors connected in series in the presence of a Ziegler-Natta catalyst system, the polyethylene resin having a density of from 0.950 to 0.965 g/cm$^3$, measured following the method of standard test ASTM 1505 at a temperature of 23° C., a melt index MI2 of from 0.5 to 5 g/10 min, measured following the method of standard test ASTM D 1238 at a temperature of 190° C. and under a load of 2.16 kg, and molecular weight distribution Mw/Mn of from 5 to 20.

By "substantially free of comonomer" it is meant that the polymerisation step to obtain the polyethylene fraction A is carried out in the absence of comonomer.

The resin according to the invention is particularly suitable for injection stretch blow moulding (ISBM). Thus the invention also covers injection stretch blow moulded articles, in particular containers, preferably containers for consumer packaging e.g. for cosmetics or detergents, as well as the use of the resin according to the invention for ISBM applications.

The process for obtaining the resin is also included herein.

DETAILED DESCRIPTION OF THE INVENTION

The Polyethylene Resin

The polyethylene resin having a multimodal, preferably bimodal, molecular weight distribution according to the present invention can be produced by polymerizing ethylene and one or more optional comonomers in the presence of a Ziegler-Natta catalyst system in two or more reactors connected in series. Due to the use of two or more reactors, the resin according to the invention comprises a high molecular weight (HMW), low density fraction and a low molecular weight (LMW), high density fraction.

Any Ziegler-Natta system known to the person skilled in the art can be used. A preferred Ziegler-Natta catalyst system comprises a titanium compound having at least one titanium-halogen bond and an internal electron donor, both on a suitable support (for example on a magnesium halide in active form), an organoaluminium compound (such as an aluminium trialkyl), and an optional external donor.

More preferably, the Ziegler-Natta catalyst system used to prepare the polyethylene resin of the present invention comprises a Ziegler-Natta catalyst component D and a preactivating agent, wherein the Ziegler Natta catalyst component D is obtainable by:

a) generating a reaction product A by contacting a magnesium dialkoxide compound with a halogenating agent;

b) contacting reaction product A with a first halogenating/titanating agent to form reaction product B;

c) contacting reaction product B with a second halogenating/titanating agent to form reaction product C; and d) contacting reaction product C with a third halogenating/titanating agent to form catalyst component D.

Products A and B are not be confused with the polyethylene fractions A and B of the resin.

Preferably, the preactivating agent is an organoaluminium compound, preferably of the formula AlR$_3$, wherein R is an alkyl having 1-8 carbon atoms or a halide, and wherein each R may be the same or different. More preferably, the organoaluminium compound is TEAL.

Preferably, the halogenating agent is ClTi(OPr)$_3$.

Preferably, the first halogenating/titanating agent a mixture of TiCl$_4$ and Ti(OBu)$_4$, in a molar ratio range of from 0.5:1 to 6:1 of TiCl$_4$/Ti(OBu)$_4$. More preferably the molar ratio is 2:1 of TiCl$_4$/Ti(OBu)$_4$.

Preferably, the second halogenating/titanating agent is TiCl$_4$.

Preferably, the third halogenating/titanating agent is also TiCl$_4$.

By "Ziegler-Natta catalyst system," we mean a Ziegler-Natta catalyst component in combination with a preactivating agent.

By "Ziegler-Natta catalyst component," we mean a transition metal compound that incorporates a Group 4-8 transition metal, preferably a Group 4-6 transition metal, and one or more ligands that satisfy the valence of the metal. The ligands are preferably halide, alkoxy, hydroxy, oxo, alkyl, and combinations thereof. Ziegler-Natta catalysts exclude metallocenes or other single-site catalysts.

It is thought that the Ziegler-Natta catalyst used in the process of this invention without being bound to theory has the effect that the resin has an overall higher molecular weight (i.e. higher extrudate swell) without affecting the low molecular weight tailing (i.e. better impact properties).

The present invention provides a polymerisation process wherein the catalyst is preferably made according to a process comprising the following steps:

a) contacting a magnesium dialkoxide compound with a halogenating agent to form a reaction product A;

b) contacting reaction product A with a first halogenating/titanating agent to form reaction product B;

c) contacting reaction product B with a second halogenating/titanating agent to form reaction product C;

and d) contacting reaction product C with a third halogenating/titanating agent to form reaction product D.

The second and third halogenating/titanating agents can comprise titanium tetrachloride. The second and third halogenating/titanating steps can each comprise a titanium to magnesium ratio in the range of about 0.1 to 5. The reaction products A, B and C can each be washed with a hydrocarbon solvent prior to subsequent halogenating/titanating steps. The reaction product D can be washed with a hydrocarbon solvent until titanium species [Ti] content is less than about 100 mmol/L.

Another embodiment of the present invention provides a polyolefin catalyst produced by a process generally comprising contacting a catalyst component of the invention together with an organometallic agent. The catalyst component is produced by a process as described above. The catalysts of the invention can have a fluff morphology amenable to polymerization production processes, and may provide a polyethylene having a molecular weight distribution of at least 5.0 and may provide uniform particle size distributions with low levels of particles of less than about 125 microns. The activity of the catalyst is dependent upon the polymerization conditions. Generally the catalyst will have an activity of at least 5,000 gPE/g catalyst, but the activity can also be greater than 50,000 gPE/g catalyst or greater than 100,000 gPE/g catalyst.

Even another embodiment of the present invention provides a polyolefin polymer produced by a process comprising: a) contacting one or more olefin monomers together in the presence of a catalyst of the invention, under polymerization conditions; and b) extracting polyolefin polymer. Generally the monomers are ethylene monomers and the polymer is polyethylene.

According to one embodiment of the invention, a method for making a catalyst component generally includes the steps of forming a metal dialkoxide from a metal dialkyl and an alcohol, halogenating the metal dialkoxide to form a reaction product, contacting the reaction product with one or more halogenating/titanating agent in three or more steps to form a catalyst component, and then treating the catalyst component with a preactivation agent such as an organoaluminum.

One embodiment of the present invention can be generally as follows:

1. $MRR' + 2R''OH \rightarrow M(OR'')_2$
2. $M(OR'')_2 + ClAR'''_x \rightarrow \text{"A"}$
3. $\text{"A"} + TiCl_4/Ti(OR''')_4 \rightarrow \text{"B"}$
4. $\text{"B"} + TiCl_4 \rightarrow \text{"C"}$;
5. $\text{"C"} + TiCl_4 \rightarrow \text{"D"}$
6. "D"+preactivating agent→catalyst In the above formulas, M can be any suitable metal, usually a Group IIA metal, typically Mg. In the above formulas, R, R', R', R''', and R'''' are each independently hydrocarbyl or substituted hydrocarbyl moieties, with R and R' having from 1 to 20 carbon atoms, generally from 1 to 10 carbon atoms, typically from 2 to 6 carbon atoms, and can have from 2 to 4 carbon atoms. R'' generally comprises from 3 to 20 carbon atoms, R''' generally comprises from 2-6 carbon atoms, and R'''' generally comprises from 2-6 carbon atoms and is typically butyl. Any combination of two or more of R, R', R'', and R'''' can be used, may be the same, or the combination of the R groups may be different from one another.

In the above embodiment comprising formula $ClAR'''_x$, A is a non-reducing oxyphilic compound which is capable of exchanging one chloride for an alkoxide, R''' is a hydrocarbyl or substituted hydrocarbyl, and x is the valence of A minus 1. Examples of A include titanium, silicon, aluminum, carbon, tin and germanium, typically is titanium or silicon wherein x is 3. Examples of R''' include methyl, ethyl, propyl, isopropyl and the like having 2-6 carbon atoms. Nonlimiting examples of a chlorinating agent that can be used in the present invention are $ClTi(O^iPr)_3$ and $ClSi(Me)_3$.

The metal dialkoxide of the above embodiment is chlorinated to form a reaction product "A". While the exact composition of product "A" is unknown, it is believed that it contains a partially chlorinated metal compound, one example of which may be $ClMg(OR'')$.

Reaction product "A" is then contacted with one or more halogenating/titanating agent, such as for example a combination of $TiCl_4$ and $Ti(OBu)_4$, to form reaction product "B". Reaction product "B" which is probably a complex of chlorinated and partially chlorinated metal and titanium compounds. Reaction product "B" can comprise a titanium impregnated $MgCl_2$ support and for example, may possibly be represented by a compound such as $(MCl_2)_y (TiCl_x(OR)_{4-x})_z$. Reaction product "B" can be precipitated as a solid from the catalyst slurry.

The second halogenation/titanation step produces reaction product, or catalyst component, "C" which is also probably a complex of halogenated and partially halogenated metal and titanium compounds but different from "B" and may possibly be represented by $(MCl_2)_y (TiCl_{x'}(OR)_{4-x'})_{z'}$. It is expected that the level of halogenation of "C" would be greater than that of product "B". This greater level of halogenation can produce a different complex of compounds.

The third halogenation/titanation step produces a reaction product, or catalyst component, "D" which is also probably a complex of halogenated and partially halogenated metal and titanium compounds but different from "B" and "C", and may possibly be represented by $(MCl_2)_{y''}(TiCl_{x''}(OR)_{4-x''})_{z''}$. It is expected that the level of halogenation of "D" would be greater than that of product "C". This greater level of halogenation would produce a different complex of compounds. While this description of the reaction products offers the most probable explanation of the chemistry at this time, the invention as described in the claims is not limited by this theoretical mechanism.

Metal dialkyls and the resultant metal dialkoxides suitable for use in the present invention can include any that can be utilized in the present invention to yield a suitable polyolefin catalyst. These metal dialkoxides and dialkyls can include Group IIA metal dialkoxides and dialkyls. The metal dialkoxide or dialkyl can be a magnesium dialkoxide or dialkyl. Non-limiting examples of suitable magnesium dialkyls include diethyl magnesium, dipropyl magnesium, dibutyl magnesium, butylethylmagnesium, etc. Butylethylmagnesium (BEM) is one suitable magnesium dialkyl.

In the practice of the present invention, the metal dialkoxide can be a magnesium compound of the general formula $Mg(OR'')_2$ where R'' is a hydrocarbyl or substituted hydrocarbyl of 1 to 20 carbon atoms.

The metal dialkoxide can be soluble and is typically non-reducing. A non-reducing compound has the advantage of forming $MgCl_2$ instead of insoluble species that can be formed by the reduction of compounds such as MgRR', which can result in the formation of catalysts having a broad particle size distribution. In addition, $Mg(OR'')_2$, which is less reactive than MgRR', when used in a reaction involving chlorination with a mild chlorinating agent, followed by subsequent halogenation/titanation steps, can result in a more uniform product, e.g., better catalyst particle size control and distribution.

Non-limiting examples of species of metal dialkoxides which can be used include magnesium butoxide, magnesium pentoxide, magnesium hexoxide, magnesium di(2-ethylhexoxide), and any alkoxide suitable for making the system soluble.

As a non-limiting example, magnesium dialkoxide, such as magnesium di(2-ethylhexoxide), may be produced by reacting an alkyl magnesium compound (MgRR') with an alcohol (ROH), as shown below. $MgRR' + 2R''OH \rightarrow Mg(OR'')_2 + RH + R'H$ The reaction can take place at room temperature and the reactants form a solution. R and R' may each be any alkyl group of 1-10 carbon atoms, and may be the same or different. Suitable MgRR' compounds include, for example, diethyl magnesium, dipropyl magnesium, dibutyl magnesium and butyl ethyl magnesium. The MgRR' compound can be BEM, wherein RH and R'H are butane and ethane, respectively.

In the practice of the present invention, any alcohol yielding the desired metal dialkoxide may be utilized. Generally, the alcohol utilized may be any alcohol of the general formula R"OH where R" is an alkyl group of 2-20 carbon atoms, the carbon atoms can be at least 3, at least 4, at least 5, or at least 6 carbon atoms. Non-limiting examples of suitable alcohols include ethanol, propanol, isopropanol, butanol, isobutanol, 2-methyl-pentanol, 2-ethylhexanol, etc. While it is believed that almost any alcohol may be utilized, linear or branched, a higher order branched alcohol, for example, 2-ethyl-1-hexanol, can be utilized.

The amount of alcohol added can vary, such as within a non-exclusive range of 0 to 10 equivalents, is generally in the range of about 0.5 equivalents to about 6 equivalents (equivalents are relative to the magnesium or metal compound throughout), and can be in the range of about 1 to about 3 equivalents.

Alkyl metal compounds can result in a high molecular weight species that is very viscous in solution. This high viscosity may be reduced by adding to the reaction an aluminum alkyl such as, for example, triethylaluminum (TEAl), which can disrupt the association between the individual alkyl metal molecules. The typical ratio of alkyl aluminum to metal can range from 0.001:1 to 1:1, can be 0.01 to 0.5:1 and also can range from 0.03:1 to 0.2:1. In addition, an electron donor such as an ether, for example, diisoamyl ether (DIAE), may be used to further reduce the viscosity of the alkyl metal. The typical ratio of electron donor to metal ranges from 0:1 to 10:1 and can range from 0.1:1 to 1:1.

Agents useful in the step of halogenating the metal alkoxide include any halogenating agent which when utilized in the present invention will yield a suitable polyolefin catalyst. The halogenating step can be a chlorinating step where the halogenating agent contains a chloride (i.e. is a chlorinating agent).

Halogenating of the metal alkoxide compound is generally conducted in a hydrocarbon solvent under an inert atmosphere. Non-limiting examples of suitable solvents include toluene, heptane, hexane, octane and the like. In this halogenating step, the mole ratio of metal alkoxide to halogenating agent is generally in the range of about 6:1 to about 1:3, can be in the range of about 3:1 to about 1:2, can be in the range of about 2:1 to about 1:2, and can also be about 1:1.

The halogenating step is generally carried out at a temperature in the range of about 0° C. to about 100° C. and for a reaction time in the range of about 0.5 to about 24 hours. The halogenating step can be carried out at a temperature in the range of about 20° C. to about 90° C. and for a reaction time in the range of about 1 hour to about 4 hours.

Once the halogenating step is carried out and the metal alkoxide is halogenated, the halide product "A" can be subjected to two or more halogenating/titanating treatments.

The halogenation/titanation agents utilized can be blends of two tetra-substituted titanium compounds with all four substituents being the same and the substituents being a halide or an alkoxide or phenoxide with 2 to 10 carbon atoms, such as TiCl$_4$ or Ti(OR"")$_4$. The halogenation/titanation agent utilized can be a chlorination/titanation agent.

The halogenation/titanation agent may be a single compound or a combination of compounds. The method of the present invention provides an active catalyst after the first halogenation/titanation; however, there are desirably a total of at least three halogenation/titanation steps.

The first halogenation/titanation agent is typically a mild titanation agent, which can be a blend of a titanium halide and an organic titanate. The first halogenation/titanation agent can be a blend of TiCl$_4$ and Ti(OBu)$_4$ in a range from 0.5:1 to 6:1 TiCl$_4$/Ti(OBu)$_4$, the ratio can be from 2:1 to 3:1. It is believed that the blend of titanium halide and organic titanate react to form a titanium alkoxyhalide, Ti(OR)$_a$X$_b$, where OR and X are alkoxide and halide, respectively and a+b is the valence of titanium, which is typically 4.

In the alternative, the first halogenation/titanation agent may be a single compound. Examples of a first halogenation/titanation agent are Ti(OC$_2$H$_5$)$_3$Cl, Ti(OC$_2$H$_5$)$_2$Cl$_2$, Ti(OC$_3$H$_7$)$_2$Cl$_2$, Ti(OC$_3$H$_7$)$_3$Cl, Ti(OC$_4$H$_9$)Cl$_3$, Ti(OC$_6$H$_{13}$)$_2$ Cl$_2$, Ti(OC$_2$H$_5$)$_2$Br$_2$, and Ti(OC$_{12}$H$_5$)Cl$_3$.

The first halogenation/titanation step is generally carried out by first slurrying the halogenation product "A" in a hydrocarbon solvent at room temperature/ambient temperature. Nonlimiting examples of suitable hydrocarbons solvent include heptane, hexane, toluene, octane and the like. The product "A" can be at least partially soluble in the hydrocarbon solvent.

A solid product "B" is precipitated at room temperature following the addition of the halogenation/titanation agent to the soluble product "A". The amount of halogenation/titanation agent utilized must be sufficient to precipitate a solid product from the solution. In general, the amount of halogenation/titanation agent utilized, based on the ratio of titanium to metal, will generally be in the range of about 0.5 to about 5, typically in the range of about 1 to about 4, and can be in the range about 1.5 to about 2.5.

The solid product "B" precipitated in this first halogenation/titanation step is then recovered by any suitable recovery technique, and then washed at room/ambient temperature with a solvent, such as hexane. Generally, the solid product "B" is washed until the [Ti] is less than about 100 mmol/L. Within the present invention [Ti] represents any titanium species capable of acting as a second generation Ziegler catalyst, which would comprise titanium species that are not part of the reaction products as described herein. The resulting product "B" is then subjected to a second and third halogenating/titanating steps to produce products "C" and "D". After each halogenating/titanating step the solid product can be washed until the [Ti] is less than a desired amount. For example, less than about 100 mmol/L, less than about 50 mmol/L, or less than about 10 mmol/L. After the final halogenating/titanating step, the product can be washed until the [Ti] is less than a desired amount, for example, less than about 20 mmol/L, less than about 10 mmol/L, or less than about 1.0 mmol/L. It is believed that a lower [Ti] can produce improved catalyst results by reducing the amount of titanium that can act as a second generation Ziegler species. It is believed that a that a lower [Ti] can be a factor in producing improved catalyst results such as a narrower MWD.

The second halogenation/titanation step is generally carried out by slurrying the solid product recovered from the first titanation step, solid product "B", in a hydrocarbon solvent. Hydrocarbon solvents listed as suitable for the first halogenation/titanation step may be utilized. The second and third halogenation/titanation steps can utilize a different compound or combination of compounds from the first halogenation/titanation step. The second and third halogenation/titanation steps can utilize the same agent at a concentration that is stronger than that used in the first halogenation/titanation agent, but this is not a necessity. The second and third halogenating/titanating agents can be a titanium halide, such as titanium tetrachloride (TiCl$_4$). The halogenation/titanation agent is added to the slurry. The addition can be carried out at ambient/room temperature, but can also be carried out at temperatures and pressures other than ambient.

Generally, the second and third halogenation/titanation agents comprise titanium tetrachloride. Typically the second and third halogenation/titanation steps each comprise a titanium to magnesium ratio in a range of about 0.1 to 5, a ratio of about 2.0 can also be used, and a ratio of about 1.0 can be used. The third halogenation/titanation step is generally carried out at room temperature and in a slurry, but can also be carried out at temperatures and pressures other than ambient.

The amount of titanium tetrachloride utilized, or alternate halogenation/titanation agent, may also be expressed in terms of equivalents, an equivalent herein is amount of titanium relative to the magnesium or metal compound. The amount of titanium of each of the second and third halogenating/titanating steps will generally be in the range of about 0.1 to about 5.0 equivalents, can be in the range of about 0.25 to about 4 equivalents, typically is in the range of about 0.3 to about 3 equivalents, and it can be desirable to be in the range of about 0.4 to about 2.0 equivalents. In one particular embodiment, the amount of titanium tetrachloride utilized in each of the second and third halogenation/titanation steps is in the range of about 0.45 to about 1.5 equivalent.

The catalyst component "D" made by the above described process may be combined with an organometallic catalyst component (a "preactivating agent") to form a preactivated catalyst system suitable for the polymerization of olefins. Typically, the preactivating agents which are used together with the transition metal containing catalyst component "D" are organometallic compounds such as aluminum alkyls, aluminum alkyl hydrides, lithium aluminum alkyls, zinc alkyls, magnesium alkyls and the like. Preferably, the preactivating agent is selected from the group consisting of trialkylaluminums, dialkylaluminum halides, and alkylaluminum dihalides.

The preactivating agent is preferably an organoaluminum compound. The organoaluminum preactivating agent is typically an aluminum alkyl of the formula $AlR_3$ wherein at least one R is an alkyl having 1-8 carbon atoms or a halide, and wherein each of the R may be the same or different. Suitable preactivating agents include trialkyl aluminum such as, for example, trimethyl aluminum (TMA), triethylaluminum (TEAL), triisobutylaluminum (TIBAL) and also include diethylaluminum chloride, triisobutylaluminum chloride, butylaluminum dichloride, and the like, and mixtures thereof. The organoaluminum preactivating agent is more preferably trimethyl aluminum (TMA), triethyl aluminum (TEAL), triisobutyl aluminum (TIBAL) or mixtures thereof. Preferably, the preactivating agent is TEAL, since with TEAL the molecular weight distribution (MWD) of the bimodal polyethylene prepared in the two reactors in series is even wider than when using other organoaluminum preactivating agents. Generally, when using TEAL as the preactivating agent the MWD will be at least 4.

In general, the ratio of Al to titanium can be in the range from 0.1:1 to 2:1 and typically is 0.25:1 to 1.2:1.

Optionally, the Ziegler-Natta catalyst may be pre-polymerized. Generally, a prepolymerization process is affected by contacting a small amount of monomer with the catalyst after the catalyst has been contacted with the preactivating agent. A prepolymerization process is described in U.S. Pat. Nos. 5,106,804; 5,153,158; and 5,594,071, hereby incorporated by reference.

Optionally, an electron donor may be added with the halogenation agent, the first halogenation/titanation agent, or the subsequent halogenation/titanation agent or agents. It may be desirable to have an electron donor utilized in the second halogenation/titanation step. Electron donors for use in the preparation of polyolefin catalysts are well known, and any suitable electron donor may be utilized in the present invention that will provide a suitable catalyst. Electron donors, also known as Lewis bases, are organic compounds of oxygen, nitrogen, phosphorous, or sulfur which can donate an electron pair to the catalyst.

The electron donor may be a monofunctional or polyfunctional compound, can be selected from among the aliphatic or aromatic carboxylic acids and their alkyl esters, the aliphatic or cyclic ethers, ketones, vinyl esters, acryl derivatives, particularly alkyl acrylates or methacrylates and silanes. An example of a suitable electron donor is di-n-butyl phthalate. A generic example of a suitable electron donor is an alkylsilylalkoxide of the general formula $RSi(OR')_3$, e.g., methylsilyltriethoxide [$MeSi(OEt_3)$], where R and R' are alkyls with 1-5 carbon atoms and may be the same or different.

For the polymerization process, an internal electron donor can be used in the synthesis of the catalyst and an external electron donor or stereoselectivity control agent (SCA) to activate the catalyst at polymerization. An internal electron donor may be used in the formation reaction of the catalyst during the halogenation or halogenation/titanation steps. Compounds suitable as internal electron donors for preparing conventional supported Ziegler-Natta catalyst components include ethers, diethers, ketones, lactones, electron donors compounds with N, P and/or S atoms and specific classes of esters. Particularly suitable are the esters of phthalic acid, such as diisobutyl, dioctyl, diphenyl and benzylbutylphthalate; esters of malonic acid, such as diisobutyl and diethylmalonate; alkyl and arylpivalates; alkyl, cycloalkyl and arylmaleates; alkyl and aryl carbonates such as diisobutyl, ethyl-phenyl and diphenylcarbonate; succinic acid esters, such as mono and diethyl succinate.

External donors which may be utilized in the preparation of a catalyst according to the present invention include organosilane compounds such as alkoxysilanes of general formula $SiR_m(OR')_{4-m}$, where R is selected from the group consisting of an alkyl group, a cycloalkyl group, an aryl group and a vinyl group; R' is an alkyl group; and m is 0-3, wherein R may be identical with R'; when m is 0, 1 or 2, the R' groups may be identical or different; and when m is 2 or 3, the R groups may be identical or different.

The external donor of the present invention can be selected from a silane compound of the following formula: wherein $R_1$ and $R_4$ are both an alkyl or cycloalkyl group containing a primary, secondary or tertiary carbon atom attached to the silicon, $R_1$ and $R_4$ being the same or different; $R_2$ and $R_3$ are alkyl or aryl groups. $R_1$ may be methyl, isopropyl, cyclopentyl, cyclohexyl or t-butyl; $R_2$ and $R_3$ may be methyl, ethyl, propyl, or butyl groups and not necessarily the same; and $R_4$ may also methyl, isopropyl, cyclopentyl, cyclohexyl or t-butyl. Specific external donors are cyclohexylmethyldimethoxy silane (CMDS), diisopropyldimethoxysilane (DIDS) cyclohexylisopropyl dimethoxysilane (CIDS), dicyclopentyldimethoxysilane (CPDS) or di-t-butyl dimethoxysilane (DTDS).

According to the present invention the polyethylene resin is prepared in two or more serially connected reactors, preferably loop reactors, more preferably slurry loop reactors, most preferably liquid full loop reactors in the presence of same or different Ziegler-Natta catalyst systems.

Preferably, the high density and low density fractions are produced in two serially connected loop reactors with the same catalyst system. While preferably the HMW polyethylene fraction is produced in the first reactor and the LMW polyethylene fraction is produced in the second reactor, the opposite order is also possible. That is, the lower molecular weight polyethylene can also be produced in the first of the two reactors connected in series. The $M_w$ in each of the zones can be regulated by known techniques such as choice of catalyst, reactor temperature, and amount of hydrogen used.

The catalyst system may be employed in a solution polymerisation process, a slurry polymerisation process or a gas phase polymerisation process. Preferably a slurry process is used. The most preferred polymerisation process is carried out in two serially connected slurry loop reactors, advantageously liquid full loop reactors i.e. a double loop reactor.

In a preferred arrangement, the product of a first reactor, including the olefin monomer, is contacted with the second co-reactant and the catalyst system in a second reactor to produce and mix the second polyolefin with the first polyolefin in the second reactor. This is also known as a chemical blend. The first and second reactors are conveniently interconnected, i.e. serially connected, reactors such as interconnected loop reactors. It is also possible to introduce into the second reactor fresh olefin monomer as well as the product of the first reactor.

Because the second polyolefin is produced in the presence of the first polyolefin a multimodal or at least bimodal molecular weight distribution is obtained.

In one embodiment of the invention, the first co-reactant in the first reactor is hydrogen, to produce the LMW fraction and the second co-reactant in the second reactor is the comonomer to produce the HMW fraction. Typical comonomers include hexene, butene, octene or methylpentene, preferably hexene.

In an alternative embodiment, the first co-reactant in the first reactor is the comonomer, preferably hexene. Homopolymerisation then takes place in the second reactor with little or no interference from the comonomer. Preferably, unreacted comonomer is removed before the polyethylene fraction from the first reactor is transferred to the second reactor.

The temperature in each reactor may be in the range of from 60° C. to 110° C., preferably from 78° C. to 98° C.

The high molecular weight, low density fraction has a density of at least 0.908 g/cm$^3$, preferably of at least 0.922 g/cm$^3$ and of at most 0.938 g/cm$^3$, more preferably of at most 0.945 g/cm$^3$. Most preferably it is of about 0.936 g/cm$^3$. It has a high load melt index HL275 of at least 1.5 dg/min, more preferably of at least 5 dg/min and most preferably of at least 7 dg/min and of at most 14 dg/min, more preferably of at most 10 dg/min. Most preferably, it is of 8 to 9 dg/min. The HLMI can be calculated from the HL275 by:

$$HLMI = HL275/3.2$$

The low molecular weight, high density fraction has a density of at least 0.953 g/cm$^3$, more preferably of at least 0.957 g/cm$^3$, and of at most 0.978 g/cm$^3$, more preferably of at most 0.962 g/cm$^3$. Most preferably it is of about 0.957 to 0.976 g/cm$^3$.

The HLMI and density of the fraction in the second reactor were determined using the following formula:

$$\text{Log HLMI}_{final} = wt\%_{1st} \times \text{Log HLMI}_{1st} + wt\%_{2nd} \times \text{Log HLMI}_{2nd}$$

$$\text{density}_{final} = wt\%_{1st} \times \text{density}_{1st} + wt\%_{2nd} \times \text{density}_{2nd}$$

wherein
"final" means "of the polyethylene resin"
"1st" means "of the polyethylene fraction produced in the first reactor"
"2nd" means "of the polyethylene fraction produced in the second reactor, downstream of the first reactor"

The final resin according to the invention has a density of from 0.950 to 0.965 g/cm$^3$, preferably 0.952 to 0.962 g/cm$^3$, more preferably 0.954 to 0.962 g/cm$^3$ and most preferably 0.957 to 0.960 g/cm$^3$. The polyethylene resin has a melt index MI2 of from 0.5 to 5 g/10 min, preferably 0.8 to 3 g/10 min.

Density is measured according to ASTM 1505 at a temperature of 23° C.

HL275 is measured according to ASTM D 1238 at a temperature of 190° C. and under a load of 21.6 kg, except that a die of 2.75 mm broad instead of 2.1 mm was used.

$$HLMI = HL275/3.2$$

The melt index MI2 and high load melt index HLMI are measured by the method of standard test ASTM D 1238 respectively under a load of 2.16 kg and 21.6 kg and at a temperature of 190° C.

The molecular weight distribution is defined by the ratio Mw/Mn of the weight average molecular weight Mw to the number average molecular weight Mn as determined by gel permeation chromatography (GPC).

Preferably the polyethylene resin comprises 36 to 50 wt % of HMW fraction, preferably from 38 to 46 wt %, more preferably from 40 to 43 wt % and from 50 to 64 wt % of LMW fraction, preferably from 54 to 62 wt % and most preferably from 57 to 60 wt %. The molecular weight distribution is preferably of from 5 to 20, more preferably of from 8 to 16, most preferably of from 10 to 14. The most preferred polyethylene resin according to the present invention has a density of about 0.959 g/cm$^3$ and a melt index MI2 of about 0.8-1.8 g/10 min and a molecular weight distribution of about 10-14.

The polyethylene resin may contain additives such as, by way of example, antioxidants, light stabilizers, acid scavengers, lubricants, antistatic additives, nucleating/clarifying agents, and colorants. An overview of such additives may be found in Plastics Additives Handbook, ed. H. Zweifel, 5$^{th}$ edition, 2001, Hanser Publishers.

Injection-Stretch Blow Molding

The polyethylene resin according to the invention is particularly suitable for injection stretch blow molding applications. In particular, it provides a broad processing window, good process stability to prepare containers with good thickness repartition, good surface aspects, good finishing, high ESCR and a high top load.

The injection-stretch blow molding process of the present invention can either be a one-stage or a two-stage process. In a one-stage process injection molding of the preform and blowing of the preform to the final desired shape are performed on the same machine, whereas in a two-stage process injection-molding of the preform and blowing of the preform are conducted in different machines, which can be separated by a long distance. Thus, the two-stage process additionally requires the cooling of the preform to ambient temperature and a subsequent reheating before the blowing step.

It has now been surprisingly found that under stretching and blowing conditions similar to those used for polyethylene terephthalate, containers with high rigidity, high ESCR and high impact resistance can be obtained.

The polyethylene resins according to the invention, having such a specific composition, molecular weight and density, can lead to a marked improvement of the processing properties when the resin is used in injection-stretched-blow-moulding, while conserving or improving mechanical behaviour as compared to the same articles prepared with other resins.

The present invention also comprises the method for preparing preforms, the preforms so obtained, the use of said preforms for preparing containers, and the containers prepared from said preforms.

Polyethylene resin is generally not used in injection-stretch-blow-moulding applications and the injection-stretch-blow-moulding conditions are thus adapted accordingly.

The preform, which has an open and a closed end, is prepared by injection molding. For the present invention the polyethylene resin according to the invention is fed to an extruder, plasticized and injected under pressure into an injection mold through an opening, generally referred to as "gate". The polyethylene resin is injected into the injection mold at an injection temperature of at least 220° C., preferably of at least 230° C. The injection temperature is at most 300° C., preferably at most 290° C. and most preferably at most 280° C. The choice of injection temperature depends upon the melt flow index of the polyethylene resin. It is clear to the skilled person that a lower melt flow index requires a higher injection temperature and vice versa. The injection mold is filled at such a rate as to give a ratio of mold filing rate (in cm$^3$/s) over gate size (in mm) of 15 or less, preferably of 10 or less. The preform is cooled inside the injection mold and removed from it. The ratio of mold filling rate over gate size varies depending upon the viscosity of the molten polyethylene resin, i.e. a more viscous molten polyethylene resin requires a lower value for the ratio than a more fluid molten polyethylene resin, so that a preform with good processing properties in the subsequent stretch-blowing steps will be obtained.

The two-step process comprises the steps of:
providing a preform by injection moulding on a mould, preferably on a multi-cavity mould;
cooling the preform to room temperature;
transporting the preform to the blow moulding machine;
reheating the preform in the blow moulding machine in a reflective radiant heat oven
optionally, passing the heated preform through an equilibration zone to allow the heat to disperse evenly through the preform wall;
optionally, submitting the preform to a pre-blow step;
stretching the preform axially by a centre rod;
orienting the stretched preform radially by high pressure air.

The one-step process comprises the steps of:
providing a pre-form by injection moulding on a mould, preferably on a multi-cavity mould;
optionally slightly re-heating the pre-form;
optionally, passing the heated pre-form through an equilibration zone to allow the heat to disperse evenly through the pre-form wall;
optionally, submitting the preform to a pre-blow step;
stretching the pre-form axially by a centre rod;
orienting the stretched pre-form radially by high pressure air.

In a one-stage process the preform is cooled to a temperature in the range from 90° C. to 140° C. and is stretch-blown into a container. All of these steps are performed on a single machine.

In a two-stage process the preform is allowed to cool to ambient temperature and transported to a different machine. The preforms are uniformly reheated to a temperature below the polyethylene's melting point. The reheating can be followed by an equilibration step. Subsequently, the preform is transferred to the stretch-blowing zone and secured within the blowing mold, which has the same shape as the final container, in such a way that the closed end of the preform points to the inside of the blowing mold. The preform is stretched axially with a center rod, generally referred to as "stretch rod" to bring the wall of the perform against the inside wall of the blowing mold. The stretch rod speed can go up to 2000 mm/s. Preferably it is in the range from 100 mm/s to 2000 mm/s, and more preferably in the range from 500 mm/s to 1500 mm/s. Pressurized gas is used to radially blow the preform into the blowing mold shape. The blowing is done using gas with a pressure in the range from 5 bars to 40 bars, and preferably from 10 bars to 30 bars.

The blowing of the preform can also be performed in two steps, by first pre-blowing the preform with a lower gas pressure, and then blowing the preform to its final shape with a higher gas pressure. The gas pressure in the pre-blowing step is in the range from 2 bars to 10 bars, preferably in the range from 4 bars to 6 bars. The preform is blown into its final shape using gas with a pressure in the range from 5 bars to 40 bars, more preferably from 10 bars to 30 bars, and most preferably from 15 bars to 25 bars.

Following the stretching and blowing, the container is rapidly cooled and removed from the blowing mold.

The containers obtained by the injection-stretch blow molding process of the present invention are characterized by good impact properties in combination with high rigidity and high ESCR.

The articles prepared according to the present invention are hollow containers and bottles that can be used in various food and non-food applications, in particular for consumer packaging. The food applications comprise in particular the storage of juices, dry products and dairy products. The non-food applications comprise in particular the storage of cosmetic, detergents and pharmaceutical products.

EXAMPLES

Example 1

1. Pellet Properties

The polyethylene resins of Grades X and Y have a bimodal molecular weight distribution produced in two serially connected slurry loop reactors i.e. a double loop reactor using a Ziegler-Natta catalyst system and thus comprises two polyethylene fractions. The GPC are shown in FIG. 1. Grade Z is a polyethylene resin produced in the presence of a metallocene catalyst. Grades X and Z are comparative examples.

Table 1 shows the properties of the resins Grades X, Y and Z.

TABLE 1

| Grade | | X | Y | Z |
|---|---|---|---|---|
| DENSITY | (kg/m$^3$) | 958 | 959 | 958 |
| MI-2 | (g/10 min) | 0.3 | 0.87 | 7.8 |
| HLMI | (g/10 min) | 30.1 | 77.6 | 173.5 |
| ESCR | 100% Igepal Co-630 F50 (h) | >400 | >400 | 22 |

TABLE 1-continued

| | Grade | X | Y | Z |
|---|---|---|---|---|
| GPC | Mn (g/mol) | 11904 | 11033 | 19363 |
| | Mw (g/mol) | 162481 | 126163 | 54548 |
| | Mz (g/mol) | 951002 | 846796 | 101876 |
| | d (Mw/Mn) | 13.6 | 11.4 | 2.8 |
| | d' (Mz/Mw) | 5.9 | 6.7 | 1.9 |
| Swell (%) | Log shear rate | | | |
| | 7.07 | 39 | 34.75 | N/A |
| | 14.48 | 41.25 | 39.75 | N/A |
| | 28.8 | 46 | 46.75 | N/A |
| | 71.5 | 56 | 54 | N/A |
| | 142.5 | 63.75 | 67.5 | N/A |
| | 272.1 | 75.25 | 77.75 | N/A |
| | 715.6 | 93.75 | 94 | N/A |

N/A = Not applicable. It was impossible to measure the swell.

The density was measured according to the method of standard test ASTM 1505 at a temperature of 23° C. The melt index MI2 and high load melt index HLMI were measured by the method of standard test ASTM D 1238 respectively under a load of 2.16 kg and 21.6 kg and at a temperature of 190° C.

ESCR was measured according to ASTM D 1693 using 100% Igepal CO-630 as a chemical agent.

The molecular weight distributions (MWD) d and d' are defined by the ratio Mw/Mn and Mz/Mw respectively where Mn (number average molecular weight), Mw (weight average molecular weight) and Mz (z-average molecular weight) are determined by gel permeation chromatography (GPC). MWD was measured as Mw/Mn (weight average molecular weight/number average molecular weight) determined by GPC analysis.

The swell is measured on a Gottfert 2002 capillary rheometer according to ISO11443:2005 with the proviso that the extruded samples were 10 cm long instead of 5 cm long. The method involves measuring the diameter of the extruded product at different shear velocities. The capillary selection corresponds to a die having an effective length of 10 mm, a diameter of 2 mm and an aperture of 180°. The temperature is 210° C. Shear velocities range from 7 to 715 $s^{-1}$, selected in decreasing order in order to reduce the time spent in the cylinder; 7 velocities are usually tested. When the extruded product has a length of about 10 cm, it is cut, after the pressure has been stabilised and the next velocity is selected. The extruded product (sample) is allowed to cool down in a rectilinear position.

The diameter of the extruded product is then measured with an accuracy of 0.01 mm using a vernier, at 2.5 cm ($d_{2.5}$) and at 5 cm ($d_5$) from one end of the sample, making at each position $d_{2.5}$ and $d_5$ two measurements separated by an angle of 90°, The diameter $d_o$ the one end of the sample selected for the test is extrapolated:

$$d_o = d_{2.5} + (d_{2.5} - d_5)$$

The swell G is determined as $$G = 100 \times (d_o - d_f)/d_f$$

wherein $d_f$ is the die diameter.

The swell value is measured for each of the selected shear velocities and a graph representing the swell as a function of shear velocity can be obtained.

Figure 2:
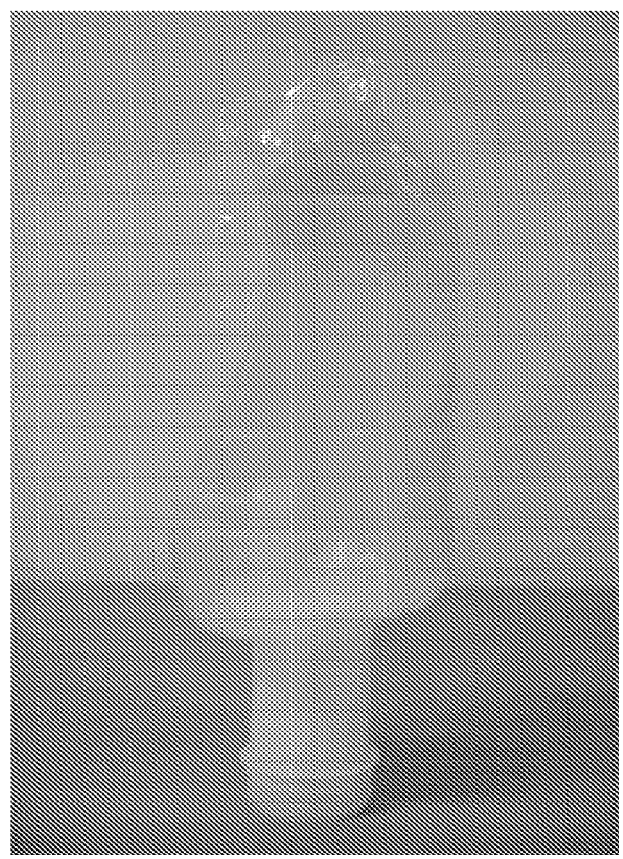
FIG. 2 shows a bottle obtained by ISBM with Grade Z according to the examples

With Grade Z which also has a higher melt flow, it was impossible to obtain an acceptable injection stretch blow moulded container, see FIG. 2.

2. Injection Process

A preform (22 g) was injected with each of Grades X and Y as described in Example 1, Table 1, and a standard commercial polyethylene terephthalate (PET) on Arburg mono cavity machine.

The conditions used for the injections are given in Table 2.

TABLE 2

| Conditions for injection | |
|---|---|
| Temperature (° C.) | 220 |
| Flow rate (cm3/s) | 10 |
| Injection speed (s) | 1.4 |
| Pressure (bar) | 400 |

These conditions are the ones which provide the best preforms.

In Table 3, the surface aspects of the preforms are shown.

TABLE 3

Figure 3:
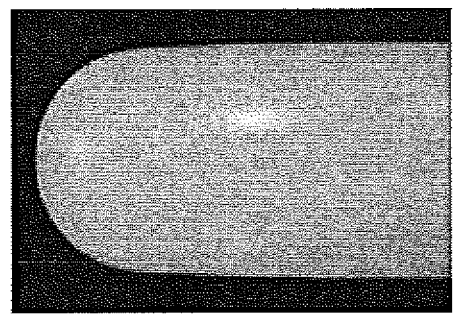
FIG. 3 shows a preform with random flow lines (made with Grade X according to the examples)

| | Preforms | | |
|---|---|---|---|
| | Grade X | Grade Y | Polyethylene terephthalate (PET) |
| Preforms | Random flow lines (see FIG. 3) | No significant marks | No marks |

Thus, it was observed that Grade B provides better, improved preforms over Grade A.

After this, these preforms were transformed into bottles by stretching and blowing.

3. Stretching/Blowing Process

Bottles of 1 Liter were blown on a SIDEL SBO8 series 2. All tests were realized with industrial equipments and industrial conditions (1700 b/h). The heating was realized using a standard heating process as conventionally used for PET. The pressure during blowing was at 15 bar.

From the preform and bottle designs, the length ratio (3.09) and hoop ratio (2.75) can be calculated.

The results on bottles obtained are given in the Table 4.

TABLE 4

Figure 4:
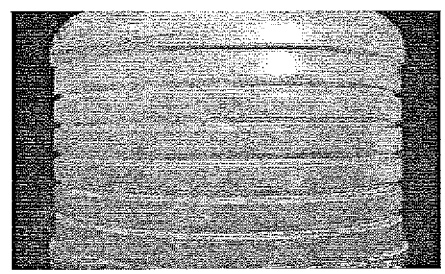
FIG. 4 shows the side view of an ISBM bottle made with Grade X according to a comparative example
Figure 5:
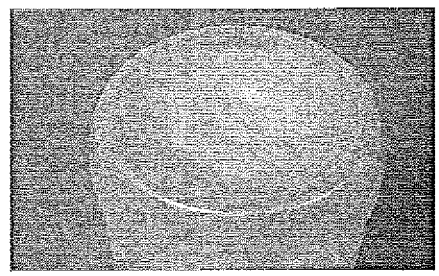
FIG. 5 shows the bottom view of a an ISBM bottle made with Grade Y according to the invention

| Bottles' Properties | | | | |
|---|---|---|---|---|
| Grade | | Grade X | Grade Y | PET |
| Surface aspect/finishing | | + (see FIG. 4) | +++ (see FIG. 5) | +++ |
| Molded drawings | | + | +++ | ++ |
| Bottle weight | g | 22 | 23 | 21 |
| Thickness repartition (horizontal) | mm | 0.2324 | 0.2509 | 0.1342 |
| | variability | 24% | 12% | 8% |
| Thickness repartition (vertical) | mm | 0.2813 | 0.2746 | 0.1696 |
| | variability | 58% | 39% | 59% |
| Dynamical compression (ISO 12048) | Fmax (about for 4 mm) | 71 | 69 | 61 |
| Drop Impact Resistance (Drop Test: 1 L water at room T ° C.) | F50 - m | >6 | >6 | 5.9 |

Molded drawings = quality of engravings

The drop tests were carried out with bottles filled with 1 liter of water at room temperature. The bottles were then dropped from increasing height, until 50% of the bottles dropped were cracked.

Grade Y shows improved aspects in comparison with predecessor Grade X i.e.
- better surface aspect and finishing
- better moulded drawings/quality of engravings
- less thickness variability both vertically and horizontally whilst maintaining an equally good drop impact resistance and dynamical compression We show here that Grade Y according to the invention has properties comparable to PET. Moreover the moulded drawings (engravings) are much more accurate with Grade Y according to the invention than when using PET.

Example 2

Furthermore, FIGS. 6 and 7 show bottle schematics and a full view of an ISBM bottle prepared with the resin according to the invention i.e. Grade Y. It was observed that even mouldings with dimensional restrictions i.e. narrower portions, can be successfully made using the resin of the invention. Furthermore, it was observed that bottles of 100 dm³ with a weight of only 22 g could be obtained, whilst maintaining all other properties. Thus the resin according to the invention enables overall reduction in weight without deteriorating other properties of an ISBM bottle.

The invention claimed is:

1. A polyethylene resin having a multimodal molecular weight distribution comprising at least two polyethylene fractions A and B, fraction A being substantially free of comonomer and having a lower weight average molecular weight and a higher density than fraction B, each fraction prepared in different reactors of two reactors connected in series in the presence of a Ziegler-Natta catalyst system, the polyethylene resin having a density of from 0.950 to 0.965 g/cm³, measured following the method of standard test ASTM 1505 at a temperature of 23° C., a melt index MI2 of from 0.5 to 5 g/10 min, measured following the method of standard test ASTM D 1238 at a temperature of 190° C. and under a load of 2.16 kg, and molecular weight distribution Mw/Mn of from 5 to 20, wherein the fraction B has a high load melt index HL275 of at least 1.5 dg/min and at most 14 dg/min.

2. The polyethylene resin of claim 1, wherein the Ziegler-Natta catalyst system comprises a Ziegler-Natta catalyst component D and a preactivating agent, wherein the Ziegler Natta catalyst component D is obtained by
   a) generating a reaction product A by contacting a magnesium dialkoxide compound with a halogenating agent;
   b) contacting reaction product A with a first halogenating/titanating agent to form reaction product B;
   c) contacting reaction product B with a second halogenating/titanating agent to form reaction product C; and
   d) contacting reaction product C with a third halogenating/titanating agent to form catalyst component D.

3. The polyethylene resin according to claim 2, wherein the preactivating agent of the Ziegler-Natta catalyst system is an organoaluminium compound.

4. The polyethylene resin according to claim 1, wherein at least one of the reactors is a slurry loop reactor.

5. The polyethylene resin according to claim 4, wherein the two reactors are slurry loop reactors.

6. The polyethylene resin according to claim 1, wherein fraction B is produced in a first reactor of the two reactors and fraction A is produced in a second reactor of the two reactors.

7. The polyethylene resin according to claim 1, wherein the polyethylene resin has an environmental stress crack resistance of at least 100 h.

8. A process comprising injection stretch blow moulding a polyethylene resin having a multimodal molecular weight distribution comprising at least two polyethylene fractions A and B, fraction A being substantially free of comonomer and having a lower weight average molecular weight and a higher density than fraction B, each fraction prepared in different reactors of two reactors connected in series in the presence of a Ziegler-Natta catalyst system, the polyethylene resin having a density of from 0.950 to 0.965 g/cm³, measured following the method of standard test ASTM 1505 at a temperature of 23° C., a melt index MI2 of from 0.5 to 5 g/10 min, measured following the method of standard test ASTM D 1238 at a temperature of 190° C. and under a load of 2.16 kg, and molecular weight distribution Mw/Mn of from 5 to 20.

9. The polyethylene resin of claim 1, wherein the Ziegler-Natta catalyst system comprises a titanium compound having at least one titanium-halogen bond.

10. The polyethylene resin of claim 1, wherein the polyethylene resin has a bimodal molecular weight distribution.

11. The polyethylene resin of claim 1, wherein the fraction B has a density of at least 0.908 g/cm³ and at most 0.945 g/cm³, measured following the method of standard test ASTM 1505 at a temperature of 23° C.

12. The polyethylene resin of claim 1, wherein the fraction B has a high load melt index HL275 of at least 5 dg/min and at most 10 dg/min.

13. The polyethylene resin of claim 1, wherein the fraction A has a density of at least 0.953 g/cm³ and at most 0.978 g/cm³, measured following the method of standard test ASTM 1505 at a temperature of 23° C.

14. The polyethylene resin of claim 1, wherein the polyethylene resin comprises from 36 to 50 wt % of the fraction B and from 50 to 64 wt % of the fraction A.

15. The process of claim 8, wherein the Ziegler-Natta catalyst system comprises a titanium compound having at least one titanium-halogen bond and an internal electron donor, both on a support, and an organoaluminum compound.

16. The process of claim 8, wherein the fraction B has a high load melt index HL275 of at least 1.5 dg/min and at most 14 dg/min.

* * * * *